United States Patent
Ogawa et al.

[11] Patent Number: 6,162,527
[45] Date of Patent: Dec. 19, 2000

[54] BIAXIALLY ORIENTED POLYESTER FILM

[75] Inventors: Tatsuya Ogawa; Hideaki Watanabe, both of Sagamihara, Japan

[73] Assignee: Teijin Limited, Osaka, Japan

[21] Appl. No.: 09/207,509

[22] Filed: Dec. 9, 1998

Related U.S. Application Data

[63] Continuation-in-part of application No. 08/857,824, May 16, 1997, abandoned.

[30] Foreign Application Priority Data

May 17, 1996 [JP] Japan ................................ 8-123223

[51] Int. Cl.$^7$ .............................. B32B 5/02; B32B 19/02; B32B 27/04; B32B 27/36

[52] U.S. Cl. ....................... 428/141; 428/220; 428/323; 428/327; 428/329; 428/330; 428/338; 428/480; 428/694 SL; 428/910

[58] Field of Search ..................... 428/323, 327, 428/328, 329, 330, 336, 338, 141, 220, 694 SL, 480, 910

[56] References Cited

U.S. PATENT DOCUMENTS 5,556,691  9/1996  Etchu et al. ............................ 428/141

*Primary Examiner*—Paul Thibodeau
*Assistant Examiner*—Ramsey Zacharia
*Attorney, Agent, or Firm*—Sughrue, Mion, Zinn, Macpeak & Seas, PLLC

[57] ABSTRACT

A biaxially oriented polyester film which consists of a polyester composition comprising 0.0005 to 0.03% by weight of crosslinked polymer particles having an average particle diameter $d_A$ of 0.8 to 1.6 $\mu$m, 0.1 to 0.8% by weight of inert particles having an average particle diameter $d_B$ of 0.4 to 0.8 $\mu$m, and 0.05 to 1.0% by weight of inert inorganic particles having an average particle diameter $d_C$ of 0.01 to 0.3 $\mu$m and a Moh's hardness of not less than 7, and which satisfies the following equations (1) and (2):

$$1.5 \leq d_A/d_B \leq 3 \tag{1}$$

wherein $d_A$ and $d_B$ are defined as above, $$SRz/SRa \geq 20 \tag{2}$$

wherein SRz is a three dimensional 10-points average roughness of a film surface and SRa is a three dimensional center plane average roughness of a film surface.

14 Claims, 1 Drawing Sheet

FIG. 1

BIAXIALLY ORIENTED POLYESTER FILM

This is a Continuation-in-Part of application Ser. No. 08/857,824 filed May 16, 1997, now abandoned.

BACKGROUND OF THE INVENTION

This invention relates to a biaxially oriented polyester film. More specifically, it relates to a biaxially oriented polyester film which has excellent windability, abrasion resistance and running durability, can be produced at a low cost and is useful as a base film for a high-speed duplicator magnetic recording medium.

A biaxially oriented polyester film typified by a polyethylene terephthalate film is widely used as a base film for a magnetic recording medium such as a magnetic tape owing to its excellent physical and chemical properties.

Of applications to magnetic tapes, the production of tapes on which software such as movies has been recorded in advance shows remarkable growth lately. Heretofore, such software has been duplicated from a master VTR to several thousands of VTRs at a high speed. However, in recent years, a unrecorded magnetic tape is superposed on a mirror master tape on which software has been recorded and a magnetic field and temperature are applied to the superposed tapes to effect a transfer of the recorded software. In this case, the duplicating speed is extremely high, and in consequence, properties required for the magnetic tape have been changed and are changing, and new properties required for the high-speed duplicator base film are increasing. For example, there are proposed windability at the time when the tape is wound up at a high speed; a surface smoothness for obtaining close contact with the master tape and improving electromagnetic conversion characteristics; improvement of abrasion resistance against a guide roll with which the film comes into contact at the time of duplication; and the like.

Conventionally, with a view to improving windability, inert particles having a large particle diameter are contained in the base film of a magnetic recording medium to improve its air squeeze properties. However, when a large amount of inert particles having a large particle diameter are contained, the surface of a magnetic layer is pushed up by protrusions or protrusions formed by large-sized inert particles are transferred to the surface of a magnetic layer when films are wound up together, thereby greatly deteriorating the surface properties of the magnetic layer of a magnetic tape. Further, the large-sized fine inert particles are shaved off by their contact with a guide roll to generate white dusts, thereby causing a drop-out.

In addition, environment for the abrasion resistance and running durability of a magnetic tape is becoming worse and worse by the use of a surface finished cassette half or guide pin or by the use of a plastic guide pin for a cost reduction. Under the circumstances, improvements of the above properties have been desired much more than before.

JP-A 3-239731 (the term "JP-A" as used herein means an "unexamined published Japanese patent application") discloses a biaxially oriented polyester film containing crosslinked polymer particles (A) whose weight reduction rate after 30 minutes of a treatment at 300° C. is not more than 30% by weight and which has an average particle diameter of 0.05 to 3 µm and contains ethylene glycol units, particles (B) whose average particle diameter is less than 0.7 time that of the particles (A) and/or particles (C) whose average particle diameter is not less than 1.4 time that of the particles (A). This publication fails to disclose a biaxially oriented polyester film containing all of the particles (A), (B) and (C) simultaneously.

JP-A 7-169031 discloses a biaxially oriented laminate polyester film. One layer (layer A) constituting this laminate polyester film may contain 0.1 to 0.5% by weight of small-sized particles, which are selected from amorphous titanium oxide and type titanium oxide, having an average particle diameter of 0.05 to 0.3 µm in addition to 0.05 to 0.5% by weight of medium-sized inert particles having an average particle diameter of 0.4 to 0.9 µm and 0.001 to 0.05% by weight of large-sized inert particles having an average particle diameter of 1.0 to 1.5 µm. The layer A is characteristically as thin as 0.5 to 2.0 µm. This publication fails to disclose a single-layer film.

JP-A 7-252408 discloses a biaxially oriented polyester film composed of a polyester composition comprising 0.05 to 3% by weight of inert particles A having a Moh's hardness of 6 or more and an average particle diameter of 0.05 to 0.5 µm, 0.05 to 3% by weight of inorganic particles B having a Moh's hardness of below 6 and an average particle diameter of 0.1 to 1.0 µm which is larger than that of the particles A, and 0.05 to 3% by weight of crosslinked polymer particles C having an average particle diameter of 0.1 to 1.0 µm which is different from that of the particles B by not more than 0.3 µm. This biaxially oriented polyester film contains large-sized crosslinked polymer particles in a relatively large amount (a lower limit of 0.05% by weight).

It is an object of the present invention to provide a biaxially oriented polyester film.

It is another object of the present invention to provide a biaxially oriented polyester film which is excellent in windability, smoothness of base surface, abrasion resistance and the like and has such abrasion resistance and running durability to be usable for even an inferior cassette half, guide pin or the like.

It is still another object of the present invention to provide a biaxially oriented polyester film which is useful as a base film for a high-speed duplicator magnetic tape.

It is a further object of the present invention to provide a biaxially oriented laminate polyester film which has the same characteristic properties as those of the above biaxially oriented polyester film of the present invention and also excellent electromagnetic conversion characteristics and total performance and can be produced at a low cost.

Other objects and advantages of the present invention will become apparent from the following description.

According to the present invention, the above objects and advantages of the present invention can be attained by a biaxially oriented polyester film (may be referred to as "single-layer polyester film of the present invention" hereinafter) which consists of a polyester composition comprising:

a) 0.0005 to 0.03% by weight of crosslinked polymer particles having an average particle diameter $d_A$ of 0.8 to 1.6 µm, b) 0.1 to 0.8% by weight of inert particles having an average particle diameter $d_B$ of 0.4 to 0.8 µm, and c) 0.05 to 1.0% by weight of inert inorganic particles having an average particle diameter $d_C$ of 0.01 to 0.3 µm and a Moh's hardness of not less than 7, and which satisfies the following equations (1) and (2):

$$1.5 \leq d_A/d_B \leq 3 \qquad (1)$$

wherein $d_A$ and $d_B$ are defined as above, $$SRz/SRa \geq 20 \qquad (2)$$

wherein SRz is a three dimensional 10-points average roughness and SRa is a three dimensional center plane average roughness of a film surface.

Secondly, the above objects and advantages of the present invention is attained by a biaxially oriented laminate polyester film (may be referred to as "laminate polyester film of the present invention" hereinafter) which comprises a first polyester layer and a second polyester layer which is the above single-layer polyester film of the present invention formed on at least one side of the first polyester layer.

DETAILED DESCRIPTION OF THE INVENTION

The "polyester" as used in the present invention refers to a polyester comprising an aromatic dicarboxylic acid as a main dicarboxylic acid component and an aliphatic glycol as a main glycol component. This polyester is substantially linear and has film-forming properties, particularly film-forming properties by melt molding. Aromatic dicarboxylic acids include terephthalic acid, naphthalene dicarboxylic acid, isophthalic acid, diphenoxyethane dicarboxylic acid, diphenyl dicarboxylic acid, diphenyl ether dicarboxylic acid, diphenyl sulfone dicarboxylic acid, diphenyl ketone dicarboxylic acid, anthracene dicarboxylic acid and the like. Aliphatic glycols include polymethylene glycols having 2 to 10 carbon atoms such as ethylene glycol, trimethylene glycol, tetramethylene glycol, pentamethylene glycol, hexamethylene glycol and decamethylene glycol and alicyclic diols such as cyclohexane dimethanol.

In the present invention, the polyester preferably contains alkylene terephthalate and/or alkylene naphthalate as a main constituent component(s).

Of these polyesters, the preferred are polyethylene terephthalate, polyethylene-2,6-naphthalate and copolymers which contain, for example, terephthalic acid and/or 2,6-naphthalene dicarboxylic acid in a proportion of not less than 80 mol % of the total of all the dicarboxylic acid components, and ethylene glycol in a proportion of not less than 80 mol % of the total of all the glycol components. Not more than 20 mol % of the total of all the acid components may consist of the above aromatic dicarboxylic acids other than terephthalic acid and/or 2,6-naphthalene dicarboxylic acid; aliphatic dicarboxylic acids such as adipic acid and sebacic acid; alicyclic dicarboxylic acids such as cyclohexane-1,4-dicarboxylic acid; and the like. Not more than 20 mol % of the total of all the glycol components may consist of the above glycols other than ethylene glycol; aromatic diols such as hydroquinone, resorcin and 2,2-bis (4-hydroxyphenyl)propane; aliphatic diols having an aromatic ring such as 1,4-dihydroxydimethylene benzene; polyalkylene glycols (polyoxyalkylene glycols) such as polyethylene glycol, polypropylene glycol and polytetramethylene glycol; and the like.

The polyester In the present invention includes also those copolymerized with or bonded to a component derived from an oxycarboxylic acid such as an aromatic oxyacid exemplified by hydroxybenzoic acid and an aliphatic oxyacid exemplified by ω-hydroxycaproic acid in a proportion of not more than 20 mol % based on the total of all dicarboxylic acid components and oxycarboxylic acid components.

The polyester in the present invention further includes those copolymerized with a polycarboxylic acid or polyhydroxy compound having 3 or more functional groups, such as trimellitic acid, pentaerythritol or the like in such an amount that it is substantially linear, for example, not more than 2 mol % of the total of all the acid components.

The polyester is known per se and can be produced by a method known per se.

The biaxially oriented polyester film of the present invention consists of a polyester composition comprising three different kinds of inert particles having different average particle diameters.

First inert particles (to be referred to as "inert particles A" hereinafter) are crosslinked polymer particles having an average particle diameter $d_A$ of 0.8 to 1.6 μm and are contained in an amount of 0.0005 to 0.03% by weight. If the average particle diameter $d_A$ and amount of the inert particles A are below the above ranges, the effect of improving windability will be insufficient disadvantageously, while if the particle size $d_A$ and amount of the inert particles A are above the above ranges, the electromagnetic conversion characteristics and abrasion resistance of a magnetic tape formed therefrom will deteriorate. The average particle diameter $d_A$ of the inert particles A is preferably in the range of 0.9 to 1.5 μm, more preferably 1.0 to 1.4 μm. The amount of the inert particles A is preferably in the range of 0.0006 to 0.025% by weight, more preferably 0.0007 to 0.02% by weight.

The inert particles A are preferably at least one member selected from crosslinked silicone resin particles and crosslinked polystyrene particles. This is because they have high affinity for polyesters and are soft enough to absorb impact applied to their protrusions and the protrusions hardly fall off by a high-speed collision therewith.

The inert particles A preferably have an apparent Young's modulus of 10 to 100 $kgf/mm^2$, more preferably 10 to 50 $kgf/mm^2$. If the apparent Young's modulus is less than 10 $kgf/mm^2$, the particles contained in the film cannot withstand stress at the time of stretching and deform, whereby it is difficult to form high protrusions required for providing windability. On the other hand, if the apparent Young's modulus is more than 100 $kgf/mm^2$, the particles will become too hard, have poor impact resistance and are apt to fall off.

Second inert particles (to be referred to as "inert particles B" hereinafter) are particles having an average particle diameter $d_B$ of 0.4 to 0.8 μm and contained in an amount of 0.1 to 0.8% by weight. If the average particle diameter and amount of the inert particles B are below the above ranges, the slipperiness of the film will deteriorate, the film will be difficult to be wound up, and the running of the film in a VTR will be unstable, while if the average particle diameter and the amount are above the above ranges, abrasion resistance will deteriorate. The average particle diameter $d_B$ of the inert particles B is preferably in the range of 0.4 to 0.7 μm, more preferably 0.4 to 0.6 μm. The amount of the inert particles B is preferably in the range of 0.12 to 0.7% by weight, more preferably 0.15 to 0.6% by weight.

Kind of the inert particles B is not limited to a particular one. Preferred examples of the inert particles B include (1) silicon dioxide (including hydrates, quartz sand, quartz and the like); (2) alumina in various crystal forms; (3) silicates containing not less than 30% by weight of $SiO_2$ [such as amorphous or crystalline clay minerals, alluminosilicates (including calcined products and hydrates), chrysotile, zircon, fly ash and the like]; (4) oxides of Mg, Zn, Zr and Ti;

(5) sulfates of Ca and Ba; (6) phosphates of Li, Ba and Ca (including monohydrate and dihydrate); (7) benzoates of Li, Na and K; (8) terephthalates of Ca, Ba, Zn and Mn; (9) titanates of Mg, Ca, Ba, Zn, Cd, Pb, Sr, Mn, Fe, Co and Ni; (10) chromates of Ba and Pb; (11) carbon (such as carbon black, graphite and the like); (12) glass (such as glass powders, glass beads and the like); (13) carbonates of Ca and Mg; (14) fluorite; and (15) Zn. Of these, calcium carbonate is the most preferred.

Third inert particles (to be referred to as "inert particles C" hereinafter) are inert inorganic particles having a Moh's hardness of not less than 7 and an average particle diameter $d_C$ of 0.01 to 0.3 μm and contained in an amount of 0.05 to 1.0% by weight. If the Moh's hardness of the inert inorganic particles C is less than 7, the scratch resistance will be unsatisfactory disadvantageously. Aluminum oxide (alumina) and spinel type oxides are preferred as the inert particles C. The inert particles C may be used singly or in admixture of two or more. The inert particles C are preferably agglomerates of particles having an average agglomeration rate of 2 to 20. If the average agglomeration rate is above or below the above range, the scratch resistance will be insufficient disadvantageously. The average agglomeration rate is preferably in the range of 2 to 15, more preferably 2 to 10, the most preferably 2 or more but less than 5 from a viewpoint of a scratch resistance improving effect.

When the inert particles C are agglomerates of aluminium oxide (alumina) particles and the alumina is of Θ type crystals, advantageously, the scratch resistance improving effect will be large. Further, when the inert particles C are agglomerates of spinel type oxide particles and they are $MgAl_2O_4$, advantageously, the larger scratch resistance improving effect will be obtained.

If the average particle diameter $d_C$ and amount of the inert particles C are below the above ranges, the scratch resistance improving effect will be insufficient disadvantageously. On the other hand, if the particle size and the amount are above the above ranges, the scratch resistance improving effect will be insufficient or the abrasion resistance will deteriorate disadvantageously. The average particle diameter $d_C$ of the inert inorganic particles C is preferably in the range of 0.03 to 0.25 μm, more preferably 0.05 to 0.2 μm. The amount is preferably in the range of 0.1 to 0.7% by weight, more preferably 0.15 to 0.4% by weight, the most preferably 0.2 or more but less than 0.25% by weight.

In the biaxially oriented polyester film of the present invention, which contains all of the above three kinds of inert particles A, B and C, it is necessary that the ratio of the average particle diameter $d_A$ of the inert particles A (crosslinked polymer particles) to the average particle diameter $d_B$ of the inert particles B satisfy the following expression (1).

$$1.5 \leq d_A/d_B \leq 3 \tag{1}$$

If the value of $d_A/d_B$ is less than 1.5, a windability improving effect will be insufficient, while if the value is more than 3, the electromagnetic conversion characteristics and abrasion resistance of a magnetic tape when it is fabricated into a tape will deteriorate, although the windability improving effect will be recognized. The value of $d_A/d_B$ is preferably in the range of 1.7 to 2.7, more preferably 1.9 to 2.4.

That is, it is desirable that the value satisfies the following equation (1)-1, $$1.7 \leq d_A/d_B \leq 2.7 \tag{1-1}$$

more preferably the following equation (1)-2.

$$1.9 \leq d_A/d_B \leq 2.4 \tag{1-2}$$

Further, the ratio of the three dimensional 10-points average roughness SRz to the three dimensional center plane average roughness SRa of the film surface of the biaxially oriented polyester film of the present invention must satisfy the following equation (2).

$$SRz/SRa \geq 20 \tag{2}$$

If the value of SRz/SRa is less than 20, the windability improving effect will be insufficient.

The value of SRz/SRa preferably satisfies the following equation (2)-1, $$SRz/SRa \geq 22 \tag{2-1}$$

and it is more preferably not less than 24, particularly preferably not less than 28.

SRa is preferably in the range of 10 to 25 nm, more preferably 10 to 23 nm, particularly preferably 10 to 21 nm.

SRz is preferably in the range of 300 to 600 nm, more preferably 320 to 550 nm, particularly preferably 340 to 500 nm.

Further, the biaxially oriented polyester film of the present invention preferably has a centerline average roughness Ra of 10 to 25 nm, more preferably 11 to 22 nm, particularly preferably 12 to 20 nm. If the centerline average roughness Ra is less than 10 nm, the surface will be too flat with the result that the effect of improving windability and running durability will be small, while if it is more than 25 nm, the surface will be too rough with the result that the electromagnetic conversion characteristics will deteriorate disadvantageously when the biaxially oriented polyester film is made into a magnetic tape.

The Young's modulus in the longitudinal direction of the biaxially oriented polyester film of the present invention is not less than 400 kgf/mm², preferably not less than 450 kgf/mm² and the Young's modulus in the transverse direction thereof is not less than 500 kgf/mm², preferably not less than 600 kgf/mm². When the Young's modulus in the respective longitudinal and transverse directions is in the above ranges, the thickness of a magnetic tape for long-time recording formed from the biaxially oriented polyester film of the present invention can be reduced advantageously.

The biaxially oriented polyester film of the present invention preferably has a film thickness of 3 to 25 μm, more preferably 5 to 25 μm, particularly preferably 10 to 20 μm.

A detailed description is subsequently given of the laminate polyester film of the present invention.

The biaxially oriented laminate polyester film of the present invention comprises a first polyester layer and a second polyester layer which is the above biaxially oriented single-layer polyester film of the present invention formed on at least one side of the first polyester layer.

The laminate polyester film of the present invention comprises the single-layer polyester film of the present invention as the second layer which is formed on at least one side of the first polyester layer. The laminate polyester film of the present invention preferably has a second layer/first layer double-layer structure or a second layer/first layer/second layer triple-layer structure. The triple-layer structure is more preferred from the viewpoint of production cost because a waste film produced in the production process of the polyester film can be recycled for the formation of the first layer.

The above description and examples of the polyester forming the second layer apply to the first layer. The polyester of the first layer is preferably similar to that of the second layer.

In the laminate film of the present invention, the first layer may not contain inert particles. However, when inert particles having an average particle diameter of not less than 0.4 μm, for example, the above crosslinked polymer particles A, the inert particles B and the like are contained in the first layer to satisfy the following expression, a waste film produced in the production process of the polyester film can be recycled for the formation of the first layer advantageously.

$$W_B = W_A \times L_A / L_B \times R / (1-R)$$

wherein $W_A$ is a total content (wt %) of the crosslinked polymer A and the inert particles B contained in the second layer, $W_B$ is a content (wt %) of inert particles having an average particle diameter of not less than 0.4 μm or contained in the first layer, $L_A$ is a total thickness (μm) of the second layer(s), $L_B$ is a thickness (μm) of the first layer and R is a numerical value of 0.3 to 0.7.

In the above expression, when the value of R is larger than 0.7 or smaller than 0.3 and a recovered film is used, the content of the inert particles having an average particle diameter of not less than 0.4 μm contained in the first layer greatly changes, whereby the surface roughness of the second layer also greatly changes disadvantageously. The value of R is preferably 0.4 to 0.6. Even when small inert particles having an average particle diameter of less than 0.4 μm are contained in the first layer, the influence of the particles upon the surface of the second layer is very small.

In the laminate film of the present invention, the second layer preferably has a center line average roughness $Ra^2$ of 8 to 18 nm, more preferably 9 to 17 nm, particularly preferably 10 to 16 nm. When the center line average roughness $Ra^2$ is less than 8 nm, the surface becomes too flat and the effect of improving windability and running durability is thereby small, and when the center line average roughness $Ra^2$ is more than 18 nm, the surface becomes too rough and the electromagnetic conversion characteristics of a magnetic tape obtained therefrom deteriorate disadvantageously.

The Young's modulus in the longitudinal direction of the laminate film is preferably not less than 400 kgf/mm², more preferably not less than 450 kgf/mm². The Young's modulus in the traverse direction is preferably not less than 500 kgf/mm², more preferably not less than 600 kgf/mm². When the Young's moduli in both longitudinal and transverse directions are within the above ranges, the thickness of a magnetic tape for long-time recording formed from the laminate film of the present invention can be reduced advantageously.

By controlling the thickness of the second layer of the laminate film of the present invention, the surface properties of the second layer can be adjusted to specific ranges. The thickness of the second layer is preferably in the range of 0.5 to 2.0 μm. When the thickness is larger than 2.0 μm, it has the same characteristic properties as those of a single-layer film and when the thickness is smaller than 0.50 μm, the particles may fall off, abrasion resistance may degrade and the surface of the film may become too flat, thereby deteriorating running durability and windability. The total thickness of the laminate film is preferably 3 to 25 μm, more preferably 5 to 25 μm, particularly preferably 10 to 20 μm.

As for what is not described for the laminate film of the present invention, it should be understood that the above description of the single-layer film of the present invention or modifications which are obvious for the one of ordinary skill in the art from the description should apply to the laminate film of the present invention.

The biaxially oriented polyester film (this includes both a single-layer film and a laminate film unless otherwise stated) of the present invention preferably has a windability reference of not more than 150 at a wind-up rate of 200 m/min. When the windability reference is not more than 150, the windability improving effect is remarkable advantageously when it is used as a base film for a high-speed duplicator.

If the windability reference is larger than 150, its winding form is bad with an irregular edge face or in an extreme case, its wound roll loosens during winding when the film is wound at a high speed. The windability reference at a wind-up rate of 200 m/min is more preferably not more than 130, particularly preferably not more than 100.

The biaxially oriented polyester film of the present invention can be basically obtained by conventionally known methods or methods accumulated by the industry. For example, it can be obtained by forming an unstretched film and then, biaxially stretching the resulting unstretched film. The unstretched film having an intrinsic viscosity of 0.35 to 0.9 dl/g can be obtained by melt extruding a polyester into a film form, for example, at a temperature of a melting point (Tm: °C.) to (Tm+70)° C., and solidifying, by quenching, the film.

The unstretched film can be formed into a biaxially oriented film in accordance with any of biaxially oriented film production methods which have been accumulated heretofore. For example, the unstretched film is stretched to 2.5 to 7.0 times in one direction (longitudinal or transverse direction) at a temperature of (Tg−10) to (Tg+70)° C. (Tg: glass transition temperature of a polyester) and then to 2.5 to 7.0 times in the direction perpendicular to the above direction (transverse direction when first stretched in the longitudinal direction) at a temperature of Tg to (Tg+70)° C. In this case, the area stretch ratio is preferably set to 9 to 32 times, more preferably 12 to 32 times. The stretching means may be either simultaneous biaxial stretching or sequential biaxial stretching. Further, the biaxially oriented film can be heat-set at a temperature of (Tg+70) to Tm°C. For example, a polyethylene terephthlate film is preferably heat-set at 190 to 230° C. The heat-setting time is 1 to 60 sec, for example.

The laminate film can be obtained by first forming an unstretched laminate film and then biaxially orienting the laminate film in the same way as described above.

This unstretched laminate film can be produced by laminate film production methods which have been accumulated heretofore. For example, one in which a film layer (second layer) forming the surface of the film and a film layer (first layer) forming the core of the film are laminated together while they are molten or solidified by quenching can be employed. Stated more specifically, the unstretched laminate film can be produced by coextrusion, extrusion lamination or the like.

The biaxally oriented polyester film of the present invention is advantageously used as a base film for a magnetic recording medium.

A magnetic recording medium comprising the biaxially oriented polyester film of the present invention as a base film is (i) a magnetic recording medium comprising the biaxially oriented single-layer polyester film of the present invention as a base film and a magnetic layer formed on one side of the film, or (ii) a magnetic recording medium comprising the biaxially oriented laminate polyester film of the present invention as a base film and a magnetic layer formed on the second polyester layer of the laminate film.

The biaxially oriented polyester film of the present invention is excellent in the improvement of high-speed windability, base surface smoothness and abrasion resistance required for a base film for a magnetic recording medium such as high-speed duplicator magnetic recording medium as well as the improvement of abrasion resistance and running durability against an inferior cassette half or guide pin. Preferably, the biaxially oriented laminated polyester film of the present invention is extremely useful as a magnetic recording medium because it is excellent in electromagnetic conversion characteristics and total performance and can be produced at a low cost.

The present invention will be further detailed hereinafter with reference to Examples.

The physical property values and characteristics in the present invention including Examples were measured or are defined as follows.

(1) Average particle diameter (DP)

Particles were measured for diameters with a centrifugal particle size analyzer CP-50 supplied by Shimadzu Corporation, and there was prepared a cumulative curve from individual diameters of particles and the amounts thereof which were calculated on the basis of the resultant centrifugal sedimentation curve. The cumulative curve was read for a diameter of a particle corresponding to a 50 mass percent, and the so-read value was taken as an average particle diameter (see "Particle Size Measuring Technique" pages 242–247, 1975, issued by Nikkan Kogyo Press).

(2) Apparent Young's modulus of particles

A micro compression tester MCTM-201 manufactured by Shimadzu Corporation was used. A diamond presser was moved down at a constant load rate (29 mgf/second) to exert external force on one particle. The apparent Young's modulus was determined according to the following equation in which Y was a Young's modulus, P was a load (kgf) when the particle was broken, Z was a deviation (mm) of the presser when the particle was broken and d was a diameter (mm) of the particle. The above procedure was repeated 10 times, and an average of the ten measurement data was taken as apparent Young's modulus of the particle.

$$Y = 2.8\, P/\pi d Z$$

(3) Average agglomeration rate of particles

A film containing particles was sliced into a flake as thin as 100 nm in a cross-sectional direction thereof. When the particles were observed at a magnification of about 100,000× using a transmission electron microscope (such as JEM-1200EX manufactured by JEOL Ltd.), the minimum size particles (primary particles) which could not be divided further could be observed. The number of primary particles constituting each of 100 agglomerates (secondary particles) was counted from this photomicrograph and a value obtained by dividing the total number of primary particles by the number of measured agglomerates was taken as an average agglomeration rate.

(4) Three dimensional center plane average roughness (SRa) and three dimensional 10-points average roughness (SRz)

The three dimensional surface profile of a film surface was imaged under the conditions of a needle diameter of 2 $\mu$mR, a needle pressure of 30 mg, a measurement length of 1 mm, a sampling pitch of 42 $\mu$m, a cut-off of 0.25 mm, a magnification in the longitudinal direction of 20,000×, a magnification in the transverse direction of 200×, and 100 scanning lines, using a three dimensional roughness meter (SE-3CK supplied by Kosaka Laboratory Co., Ltd.). A surface $S_M$ portion was taken out on a center plane from the obtained profile, and a value given from the following equation was taken as SRa by plotting rectangular coordinate axes, X and Y axes, on the center plane of this portion and an axis perpendicular to the center plane as a Z axis.

$$SRa = \frac{1}{S_M} \int_0^{L_X} \int_0^{L_Y} f(x, y) d_x d_y$$

wherein $S_M = L_X \times M_Y$

The difference between the average height of first to fifth highest mountains and the average depth of first to fifth deepest valleys on a plane parallel to an average line of a portion which remains after a reference area portion was removed from the profile was taken as SRz.

(5) Film surface roughness (Ra)

A film was measured for a centerline average roughness (Ra) according to JIS-B0601 with a needle-contacting type roughness tester SURFCODER SE-30C supplied by Kosaka Laboratory Co., Ltd. The measurement conditions were as follows.

(a) Radius of contacting needle top: 2 $\mu$m
(b) Measurement pressure: 30 mg
(c) Cut-off: 0.25 mm
(d) Measurement length: 2.5 mm
(e) How to obtain data: One sample was measured six times. The largest measurement value was excluded, and Ra was expressed in terms of an average of the remaining five measurement values.

(6) Abrasion resistance against calender

The running surface of a base film were evaluated for abrasion resistance, using a three-rolls minisuper calender having a nylon roll(s) and a steel roll(s). The treatment temperature was 80° C., the linear pressure applied to the film was 200 kg/cm (300 kg/m in Examples 9 to 15), and the film velocity was 100 m/min. When the film was caused to run a total length of 4,000 m, the abrasion resistance of the base film was evaluated by abrasion dust adhering to the top roll of the calender.

<Five rating>

1st rate: No abrasion dust on nylon roll
2nd rate: Almost no abrasion dust on nylon roll
3rd rate: A little abrasion dust on nylon roll but it was removed with a dry cloth.
4th rate: Abrasion dust on nylon roll is hardly removed with a dry cloth but was removed with a solvent such as acetone.
5th rate: Heavy abrasion dust on nylon roll and the abrasion dust was hardly removed even with a solvent.

(7) Abrasion resistance against blade

The edge of a blade (a blade for testing industrial razors manufactured by GKI in USA) was applied to a film cut to ½-inch in width at a right angle under an atmosphere of a temperature of 20° C. and a humidity of 60% and pushed into the film 2 mm, and the film was caused to run (friction) at a running rate of 100 m/min and a tension at inlet of 50 g (80 g in Examples 9 to 15). After the film ran 100 m, the amount of shavings adhered to the blade were evaluated.

⊚: The deposition of shavings adhered to the blade is less than 0.5 mm (less than 0.3 mm in Examples 9 to 15).
○: The deposition of shavings adhered to the blade is 0.5 mm or more and less than 1.0 mm (not less than 0.3 mm and less than 0.6 mm in Examples 9 to 15).
Δ: The deposition of shavings adhered to the blade is 1.0 mm or more and less than 2.0 mm (not less than 0.6 mm and less than 1.0 mm in Examples 9 to 15).

x: The deposition of shavings adhered to the blade is 2.0 mm or more (not less than 1.0 mm in Examples 9 to 15).
(8) Scratch resistance and abrasion resistance in high-speed running The above resistance was measured as follows, using an apparatus shown in FIG. 1.

Figure 1:
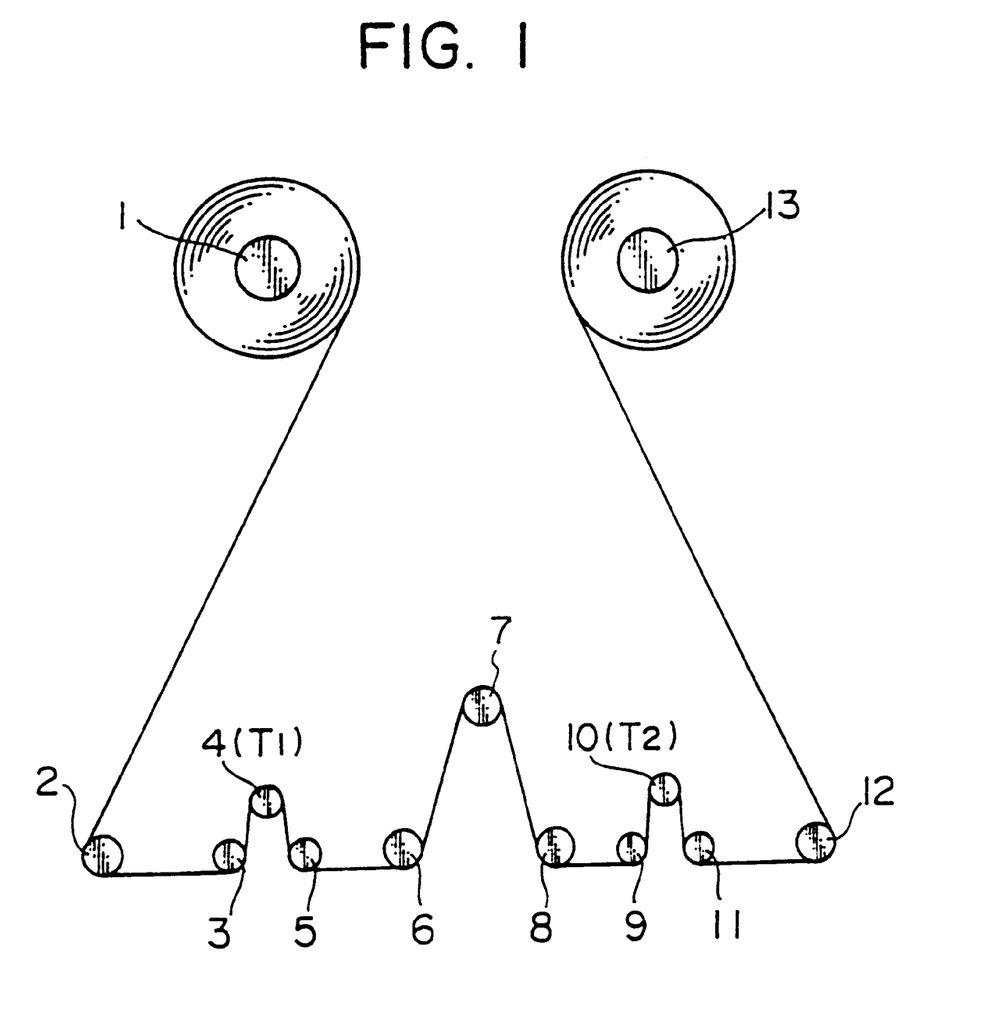
FIG. 1 is a schematic diagram of an apparatus for measuring the high-speed running scratch resistance and abrasion resistance of a biaxially oriented polyester film of the present invention.

In FIG. 1, reference numeral 1 denotes a feed reel, 2 a tension controller, 3, 5, 6, 8, 9 and 11 free rollers, 4 a tension detector (inlet), 7 a fixing rod, 10 a tension detector (outlet), 12 a guide roller and 13 a take-up reel.

A film cut to ½-inch in width was contacted to the fixed rod 7 at an angle θ of 600° under atmosphere of a temperature of 20° C. and a humidity of 60% and was caused to run 200 mm at a running rate of 300 m/min to ensure that the tension at inlet became 50 g. After running, abrasion dust adhered to the fixed rod 7 and scratch in the film were evaluated.

The above evaluation was carried out in the following three methods concerning the fixed rod.

Method A: A 6 φ tape guide (surface roughness Ra=0.015 μm) made of SUS304 and fully surface-finished was used.

Method B: A 6 φ tape guide (surface roughness Ra=0.15 μm) which was formed by bending a SUS sintered plate into a cylindrical form and insufficiently surface-finished was used.

Method C: A 6 φ tape guide made from a carbon black-containing polyacetal was used.

<Evaluation of abrasion resistance>
◎: No abrasion dust is seen.
○: A slight amount of abrasion dust is seen.
Δ: The presence of abrasion dust is seen at a glance.
x: Abrasion dust is heavily adhered.

<Evaluation of scratch resistance>
◎: No scratch is seen.
○: 1 to 5 scratches are seen.
Δ: 6 to 15 scratches are seen.
x: 16 or more scratches are seen.

(9) Low-speed repeated running friction coefficient (μk) and scratch resistance

The above properties were measured as follows, using the apparatus shown in FIG. 1.

A nonmagnetic surface of a magnetic tape was contacted to the fixed rod 7 at an angle θ=(152/180) radian (152°) under an atmosphere of a temperature of 20° C. and a humidity of 60%, and moved (friction) at a rate of 200 cm/min. The tension at outlet ($T_2$: g) was detected by the outlet tension detector after the film made 50 round trips when the tension controller 2 was adjusted such that the tension at inlet $T_1$ became 50 g and the running friction coefficient μk was calculated from the following equation.

$$\mu k = (2.303/\theta) \log (T_2/T_1) = 0.868 \log (T_2/35)$$

If the running friction coefficient (μk) was not less than 0.25, when the film was caused to run repeatedly in a VTR, its running became unstable. Therefore, the film having a running friction coefficient of not less than 0.25 was evaluated as poor running durability.

The above evaluation was carried out in the following three methods concerning the fixed rod.

Method A: A 6 φ tape guide (surface roughness Ra=0.015 μm) made of SUS304 and fully surface-finished was used.

Method B: A 6 φ tape guide (surface roughness Ra=0.15 μm) which was formed by bending a SUS sintered plate into a cylindrical form and insufficiently surface-finished was used.

Method C: A 6 φ tape guide made from a carbon black-containing polyacetal was used.

As for scratch resistance, scratch on the nonmagnetic surface of the tape after running was evaluated based on the following criteria.

<scratch evaluation>
◎: No scratch is seen.
○: 1 to 5 scratches are seen.
Δ: 6 to 15 scratches are seen.
x: 16 or more scratches are seen.

Magnetic tapes were prepared as follows.

100 parts by weight (to be simply referred to as "part" hereinafter) of γ—$Fe_2O_3$ and the following composition were kneaded and dispersed with a ball mill for 12 hours.

| | |
|---|---|
| Polyester polyurethane | 12 parts |
| Vinyl chloride-vinyl acetate-maleic anhydride copolymer | 10 parts |
| α-alumina | 5 parts |
| Carbon black | 1 part |
| Butyl acetate | 70 parts |
| Methyl ethyl ketone | 35 parts |
| Cyclohexanone | 100 parts |
| Then, the following components were added. | |
| Fatty acid: Oleic acid | 1 part |
| Fatty acid: Palmitic acid | 1 part |
| Fatty acid ester (amyl stearate) | 1 part |

The resultant mixture was kneaded for 10 to 30 minutes, and after 7 parts of an ethyl acetate solution containing 25% of a triisocyanate compound was added, the mixture was shear-dispersed at a high rate for 1 hour to prepare a magnetic coating liquid.

The so-obtained coating liquid was applied to a polyester film such that the dry thickness was 3.5 μm (2.5 μm in Examples 9 to 15).

The coating was subjected to orientation treatment in a direct current magnetic field and dried at 100° C. Then, the film was calendered and slit to a width of ½ inch to obtain a magnetic tape.

(10) Windability reference

In the apparatus shown in FIG. 1, a film in ½-inch width was set without allowing to pass the fixed rod 7, and was caused to run 200 m at a running rate of 200 m/min under an atmosphere of a temperature of 20° C. and a humidity of 60%. Its edge position was detected by a CCD camera right before it was taken up by the take-up reel 13.

Variation amount of this edge position is expressed as a waveform with respect to a time axis and the waveform is calculated from the following equation as a windability reference.

$$\text{Windability reference} = \sqrt{\frac{1}{t} \int_0^1 f(x)_2 dx}$$

wherein t is a measurement time (sec) and x is a variation amount of end face (μm).

(11) Windability

In the apparatus shown in FIG. 1, a magnetic tape produced by the above-mentioned method was set without allowing to pass the fixed rod 7 and was caused to run 500 m at a running rate of 400 m/min, and the wind-up of the film on a take-up reel and the shape of a roll of the magnetic tape were evaluated.

<Evaluation>
○: The displacement of the end face of a wound roll is not more than 1 mm (not more than 2 mm in Examples 9 to 15).
Δ: The displacement of the end face of a wound roll is more than 1 mm (not more than 2 mm in Examples 9 to 15).

x: Winding is impossible.

(12) Electromagnetic characteristics

A "VHS" VTR (BR6400, supplied by Victor Co. of Japan, Ltd.) was remodeled, and a signal having a sinewave at 4 MHz was inputted to a recording/reproduction head through an amplifier to record it on a magnetic tape. The signal was reproduced and the reproduced signal was inputted to a spectrum analyzer. A noise generated at a distance of 0.1 MHz from the carrier signal 4 MHz was measured, and the carrier/noise (C/N ratio was expressed in terms of dB unit. A magnetic tape obtained in Comparative Example 8 was measured in this manner to obtain a C/N ratio, which was taken as the standard (±0 dB). A difference between the C/N ratio of the above magnetic tape and the C/N ratio of the magnetic tape obtained in Comparative Example 8 was taken as electromagnetic characteristics.

The following examples are given to further illustrate the present invention.

Examples 1 to 8 and Comparative Examples 1 to 13

Dimethyl terephthalate and ethylene glycol were polymerized by a conventional method using manganese acetate as an ester exchange catalyst, antimony trioxide as a polymerization catalyst, phosphorous acid as a stabilizer and particles shown in Tables 1 and 2 as a lubricant to obtain polyethylene terephthalate having an intrinsic viscosity of 0.56 (measured in orthochlorophenol at 35° C.).

The pellets of this polyethylene terephthalate were dried at 170° C. for 3 hours and then, fed to the hopper of an extruder. The mixture was molten at a temperature of 280 to 300° C., and the molten polymer was let pass through a 1 mm slit die and extruded onto a rotary cooling drum having a surface temperature of 20° C. to obtain an unstretched film having a surface finishing of about 0.3 s and a thickness of 200 μm.

The thus obtained unstretched film was preheated at 75° C., and was further heated between low-speed rolls and high-speed rolls from 15 mm above by three IR heaters having a surface temperature of 800° C. to stretch it to 3.2 times, quenched and supplied to a stenter to be stretched to 4.3 times at 120° C. in the transverse direction. The obtained biaxially oriented film was heat-set at 205° C. for 5 second to obtain a heat-set biaxially oriented polyester film having a thickness of 14 μm.

The properties of the thus obtained film are shown in Tables 3 and 4.

TABLE 1

| | Crosslinked polymer particles A | | | Inert particles B | | Inert inorganic particles C | | Average agglomeration rate of particles (number of particles) | Average particle diameter ratio of particles A to particles B ($d_A/d_B$) |
|---|---|---|---|---|---|---|---|---|---|
| | Kind and average particle diameter ($d_A$) of particles (μm) | Content of particles (%) | Apparent Young's modulus (kgf/mm²) | Kind and average particle diameter ($d_B$) of particles (μm) | Content of particles (%) | Kind and average particle diameter ($d_C$) of particles (μm) | Content of particles (%) | | |
| Ex. 1 | Silicone resin 1.2 | 0.01 | 50 | Calcium carbonate 0.6 | 0.2 | θ type aluminum oxide 0.1 | 0.2 | 4.5 | 2.0 |
| Ex. 2 | Silicone resin 1.2 | 0.02 | 50 | Calcium carbonate 0.6 | 0.2 | θ type aluminum oxide 0.1 | 0.2 | 4.5 | 2.0 |
| Ex. 3 | Silicone resin 1.2 | 0.005 | 50 | Calcium carbonate 0.6 | 0.2 | θ type aluminum oxide 0.1 | 0.2 | 4.5 | 2.0 |
| Ex. 4 | Silicone resin 1.5 | 0.01 | 50 | Calcium carbonate 0.6 | 0.2 | θ type aluminum oxide 0.1 | 0.2 | 4.5 | 2.5 |
| Ex. 5 | Crosslinked polystyrene 1.2 | 0.01 | 25 | Calcium carbonate 0.6 | 0.2 | θ type aluminum oxide 0.1 | 0.2 | 4.5 | 2.0 |
| Ex. 6 | Silicone resin 1.2 | 0.01 | 50 | Calcium carbonate 0.6 | 0.2 | Spinel oxide ($MgAl_2O_4$) 0.1 | 0.2 | 4.2 | 2.0 |
| Ex. 7 | Silicone resin 1.2 | 0.01 | 50 | Calcium carbonate 0.6 | 0.2 | θ type aluminum oxide 0.1 | 0.15 | 4.5 | 2.0 |
| | | | | | | Spinel oxide ($MgAl_2O_4$) 0.1 | 0.05 | 4.2 | |
| Ex. 8 | Silicone resin 1.2 | 0.01 | 50 | Calcium carbonate 0.6 | 0.2 | θ type aluminum oxide 0.1 | 0.2 | 12.4 | 2.0 |

Ex.: Example

TABLE 2

| | Inert particles contained in film | | | | | | | | Average particle diameter ratio of particles A to particles B ($d_A/d_B$) |
|---|---|---|---|---|---|---|---|---|---|
| | Crosslinked polymer particles A | | | Inert particles B | | Inert inorganic particles C | | Average agglome- ration rate of particles (number of particles) | |
| | Kind and average particle diameter ($d_A$) of particles (μm) | Content of particles (%) | Apparent Young's modulus (kgf/mm²) | Kind and average particle dameter ($d_B$) of particles (μm) | Content of particles (%) | Kind and average particle diameter ($d_C$) of particles (μm) | Content of particles (%) | | |
| Comp. Ex. 1 | — | — | — | Calcium carbonate 0.6 | 0.2 | θ type aluminum oxide 0.1 | 0.2 | 4.5 | — |
| Comp. Ex. 2 | — | — | — | Calcium carbonate 0.4 | 0.2 | θ type aluminum oxide 0.1 | 0.2 | 4.5 | — |
| Comp. Ex. 3 | Silicone resin 1.2 | 0.01 | 50 | — | — | θ type aluminum oxide 0.1 | 0.2 | 4.5 | — |
| Comp. Ex. 4 | Silicone resin 1.2 | 0.01 | 50 | Calcium carbonate 0.6 | 0.2 | — | — | — | 2.0 |
| Comp. Ex. 5 | Silicone resin 0.7 | 0.01 | 50 | Calcium carbonate 0.6 | 0.2 | θ type aluminum oxide 0.1 | 0.2 | 4.5 | 1.2 |
| Comp. Ex. 6 | Silicone resin 2.0 | 0.03 | 50 | Calcium carbonate 0.6 | 0.2 | θ type aluminum oxide 0.1 | 0.2 | 4.5 | 3.3 |
| C. Ex. 7 | Silicone resin 1.2 | 0.05 | 50 | Calcium carbonate 0.6 | 0.2 | θ type aluminum oxide 0.1 | 0.2 | 4.5 | 2.0 |
| C. Ex. 8 | Silicone resin 1.2 | 0.01 | 200 | Calcium carbonate 0.6 | 0.2 | θ type aluminum oxide 0.1 | 0.2 | 4.5 | 2.0 |
| C. Ex. 9 | Silicone resin 1.2 | 0.01 | 50 | Calcium carbonate 0.6 | 0.2 | spherical silica 0.1 | 0.2 | 1.5 | 2.0 |
| C. Ex. 10 | Silicone resin 1.2 | 0.01 | 50 | Calcium carbonate 0.6 | 0.2 | θ type aluminum oxide 0.1 | 0.2 | 1.7 | 2.0 |
| C. Ex. 11 | Silicone resin 1.2 | 0.01 | 50 | Calcium carbonate 0.6 | 0.2 | θ type aluminum oxide 0.1 | 0.2 | 25.3 | 2.0 |
| C. Ex. 12 | Silicone resin 1.0 | 0.01 | 50 | Calcium carbonate 0.8 | 0.2 | θ type aluminum oxide 0.1 | 0.2 | 4.5 | 1.3 |
| C. Ex. 13 | Silicone resin 1.2 | 0.01 | 50 | Calcium carbonate 0.6 | 0.2 | θ type aluminum oxide 0.1 | 0.2 | 4.5 | 2.0 |

Comp. Ex.: Comparative Example
C. Ex.: Comparative Example

TABLE 3

| | Film thickness (μm) | SRz/SRa | Ra (nm) | Abrasion resistance against calender (rating) | Abrasion resistance against blade | High-speed running | | | | | |
|---|---|---|---|---|---|---|---|---|---|---|---|
| | | | | | | Scratch resistance | | | Abrasion resistance | | |
| | | | | | | Method A | Method B | Method C | Method A | Method B | Method C |
| Ex. 1 | 14.0 | 29 | 15 | 1 | ◉ | ◉ | ◉ | ◉ | ◉ | ◉ | ◉ |
| Ex. 2 | 14.0 | 33 | 16 | 2 | ○ | ◉ | ◉ | ◉ | ◉ | ◉ | ◉ |
| Ex. 3 | 14.0 | 26 | 15 | 1 | ◉ | ◉ | ◉ | ◉ | ◉ | ◉ | ◉ |
| Ex. 4 | 14.0 | 35 | 16 | 2 | ◉ | ◉ | ◉ | ◉ | ◉ | ◉ | ◉ |
| Ex. 5 | 14.0 | 29 | 15 | 1 | ◉ | ◉ | ◉ | ◉ | ◉ | ◉ | ◉ |
| Ex. 6 | 14.0 | 29 | 15 | 1 | ◉ | ◉ | ◉ | ◉ | ◉ | ◉ | ◉ |
| Ex. 7 | 14.0 | 29 | 15 | 1 | ◉ | ◉ | ◉ | ◉ | ◉ | ◉ | ◉ |
| Ex. 8 | 14.0 | 28 | 15 | 1 | ◉ | ◉ | ◉ | ○ | ◉ | ◉ | ○ |

| | Low-speed repeated running | | | | | | Windability | | Electromagnetic conversion characteristics |
|---|---|---|---|---|---|---|---|---|---|
| | Scratch resistance | | | Running friction coefficient | | | | | |
| | Method A | Method B | Method C | Method A | Method B | Method C | reference | Windability | C/N |
| Ex. 1 | ◉ | ◉ | ◉ | 0.21 | 0.21 | 0.20 | 60 | ○ | +1.8 |
| Ex. 2 | ◉ | ◉ | ◉ | 0.20 | 0.20 | 0.19 | 50 | ○ | +1.5 |
| Ex. 3 | ◉ | ◉ | ◉ | 0.22 | 0.22 | 0.22 | 70 | ○ | +1.9 |
| Ex. 4 | ◉ | ◉ | ◉ | 0.21 | 0.21 | 0.19 | 50 | ○ | +1.6 |
| Ex. 5 | ◉ | ◉ | ◉ | 0.21 | 0.21 | 0.21 | 60 | ○ | +1.8 |
| Ex. 6 | ◉ | ◉ | ◉ | 0.21 | 0.21 | 0.20 | 60 | ○ | +1.8 |

TABLE 3-continued

| | | | | | | | | | |
|---|---|---|---|---|---|---|---|---|---|
| Ex. 7 | ◎ | ◎ | ◎ | 0.21 | 0.21 | 0.20 | 60 | ○ | +1.8 |
| Ex. 8 | ◎ | ◎ | ○ | 0.20 | 0.20 | 0.20 | 60 | ○ | +1.7 |

Ex.: Example

TABLE 4

| | Film thickness ($\mu$m) | SRz/SRa | Ra (nm) | Abrasion resistance against calender (rating) | Abrasion resistance against blade | High-speed running | | | | | |
|---|---|---|---|---|---|---|---|---|---|---|---|
| | | | | | | Scratch resistance | | | Abrasion resistance | | |
| | | | | | | Method A | Method B | Method C | Method A | Method B | Method C |
| Comp. Ex. 1 | 14.0 | 18 | 15 | 1 | ◎ | ◎ | ◎ | ◎ | ◎ | ◎ | ◎ |
| Comp. Ex. 2 | 14.0 | 15 | 12 | 1 | ◎ | ◎ | ◎ | ◎ | ◎ | ◎ | ◎ |
| Comp. Ex. 3 | 14.0 | 60 | 7 | 1 | ◎ | ○ | ◎ | △ | ○ | ◎ | △ |
| Comp. Ex. 4 | 14.0 | 18 | 15 | 1 | ◎ | × | × | △ | ○ | ○ | ○ |
| Comp. Ex. 5 | 14.0 | 19 | 15 | 1 | ◎ | ◎ | ◎ | ◎ | ◎ | ◎ | ◎ |
| Comp. Ex. 6 | 14.0 | 48 | 19 | 4 | △ | ◎ | ◎ | ◎ | △ | △ | ○ |
| Comp. Ex. 7 | 14.0 | 37 | 18 | 4 | × | ◎ | ◎ | ◎ | ○ | ○ | ◎ |
| Comp. Ex. 8 | 14.0 | 29 | 15 | 4 | △ | △ | △ | × | △ | △ | × |
| Comp. Ex. 9 | 14.0 | 29 | 15 | 1 | ◎ | △ | △ | △ | △ | △ | △ |
| Comp. Ex. 10 | 14.0 | 29 | 15 | 1 | ◎ | △ | △ | △ | △ | △ | △ |
| Comp. Ex. 11 | 14.0 | 28 | 16 | 2 | ○ | △ | × | × | △ | △ | × |
| Comp. Ex. 12 | 14.0 | 19 | 17 | 1 | ◎ | ◎ | ◎ | ○ | ◎ | ◎ | ○ |
| Comp. Ex. 13 | 14.0 | 22 | 27 | 5 | × | ○ | ○ | ○ | ○ | △ | ○ |

| | Low-speed repeated running | | | | | | Windability | | Electromagnetic conversion characteristics |
|---|---|---|---|---|---|---|---|---|---|
| | Scratch resistance | | | Running friction coefficient | | | | | |
| | Method A | Method B | Method C | Method A | Method B | Method C | reference | Windability | C/N |
| Comp. Ex. 1 | ◎ | ◎ | ◎ | 0.21 | 0.21 | 0.21 | 150 | △ | +1.9 |
| Comp. Ex. 2 | ◎ | ◎ | ◎ | 0.23 | 0.23 | 0.24 | 200 | × | +2.5 |
| Comp. Ex. 3 | ○ | ◎ | △ | 0.32 | 0.31 | 0.31 | 140 | △ | +3.6 |
| Comp. Ex. 4 | × | × | △ | 0.23 | 0.23 | 0.22 | 60 | ○ | +1.8 |
| Comp. Ex. 5 | ◎ | ◎ | ◎ | 0.21 | 0.21 | 0.20 | 120 | △ | +1.8 |
| Comp. Ex. 6 | ◎ | ◎ | ◎ | 0.23 | 0.23 | 0.22 | 50 | ○ | −0.7 |
| Comp. Ex. 7 | ◎ | ◎ | ◎ | 0.19 | 0.19 | 0.18 | 40 | ○ | 0 |
| Comp. Ex. 8 | ○ | ○ | × | 0.22 | 0.22 | 0.28 | 60 | ○ | +1.8 |
| Comp. Ex. 9 | △ | △ | △ | 0.22 | 0.22 | 0.24 | 60 | ○ | +1.8 |
| Comp. Ex. 10 | △ | △ | △ | 0.24 | 0.26 | 0.23 | 60 | ○ | +1.8 |
| Comp. Ex. 11 | △ | × | × | 0.27 | 0.27 | 0.28 | 60 | ○ | +1.5 |
| Comp. Ex. 12 | ◎ | ◎ | ○ | 0.21 | 0.21 | 0.22 | 110 | △ | +1.3 |
| Comp. Ex. 13 | ○ | ○ | ○ | 0.20 | 0.20 | 0.21 | 80 | ○ | −2.0 |

Comp. Ex.: Comparative Example

As is evident from Tables 3 and 4, the biaxially oriented polyester films of the present invention have excellent windability and abrasion resistance as well as scratch resistance, abrasion resistance and running durability against various types of tape guides, while they maintain excellent electromagnetic conversion characteristics. Thus, they are extremely excellent in the overall properties.

Examples 9 to 12

Polyethylene terephthalate for a single-layer (layer A) film containing inert particles shown in Table 5 was produced in the same manner as in Example 1. As for Examples 13 to 15 (laminate films), polyethylene terephthalate for the second layer (layer A) of each laminate film was obtained in the same manner as in Example 1.

Polyethylene terephthalate for the first layer (to be referred to as "layer B" hereinafter) of each laminate film was obtained in the same manner as in Example 1 except that particles were not added.

The pellets of these polyethylene terephthalates were dried at 170° C. for 3 hours, fed to the hoppers of two extruders, molten at a temperature of 280 to 300° C., laminated together using a multi-manifold coextrusion die in such a manner that the layer A was formed on both sides of the layer B, and extruded onto a rotary cooling drum having a surface temperature of 20° C. to obtain an unstretched laminate film having a surface finishing of about 0.3 s and a thickness of 200 $\mu$m.

The thus obtained unstretched laminate film was stretched and heat set in the same manner as in Example 1 to obtain a 14 $\mu$m-thick heat set biaxially oriented laminate polyester film.

The thickness of each layer was adjusted by changing the discharges of the two extruders. The thickness of each layer was obtained by combining a fluorescent X-ray method and a method for searching for an interface with a transmission electron microscope by slicing the obtained film.

The characteristic properties of the obtained films are shown in Table 6.

As is evident from Table 6, the biaxially oriented laminate polyester films of the present invention have excellent electromagnetic conversion characteristics, windability and abrasion resistance as well as scratch resistance, abrasion resistance and running durability against various types of tape guides. Thus, they show extremely excellent overall properties.

As a consequence, the biaxially oriented polyester film of the present invention has excellent windability, base surface smoothness and abrasion resistance required for a base film for a high-speed duplicator magnetic tape as well as abrasion resistance and running durability against an inferior cassette half, guide pin and the like, and can be produced at a low cost. Therefore, the film has extremely excellent total performance as a magnetic recording medium.

TABLE 5

| | Inert particles contained in layer A | | | | | | | | Average particle diameter ratio of particles A to particles B ($d_A/d_B$) |
|---|---|---|---|---|---|---|---|---|---|
| | Crosslinked polymer particles A | | | Inert particles B | | Inert inorganic particles C | | | |
| | Kind and average particle diameter ($d_A$) of particles (μm) | Content of particles (%) | Apparent Young's modulus (kgf/mm²) | Kind and average particle dameter ($d_B$) of particles (μm) | Content of particles (%) | Kind and average particle diameter ($d_C$) of particles (μm) | Content of particles (%) | Average agglomeration rate of particles (number of particles) | |
| Ex. 9 | Silicone resin 1.2 | 0.0006 | 50 | Calcium carbonate 0.6 | 0.15 | θ type aluminum oxide 0.1 | 0.2 | 4.5 | 2.0 |
| Ex. 10 | Silicone resin 1.2 | 0.0008 | 50 | Calcium carbonate 0.6 | 0.15 | θ type aluminum oxide 0.1 | 0.2 | 4.5 | 2.0 |
| Ex. 11 | Silicone resin 1.2 | 0.0009 | 50 | Calcium carbonate 0.6 | 0.15 | θ type aluminum oxide 0.1 | 0.2 | 4.5 | 2.0 |
| Ex. 12 | Silicone resin 1.5 | 0.0006 | 50 | Calcium carbonate 0.6 | 0.15 | Spinel oxide ($MgAl_2O_4$) 0.1 | 0.2 | 4.2 | 2.0 |
| Ex. 13 | Silicone resin 1.2 | 0.0006 | 50 | Calcium carbonate 0.6 | 0.15 | θ type aluminum oxide 0.1 | 0.2 | 4.5 | 2.0 |
| Ex. 14 | Silicone resin 1.2 | 0.0006 | 50 | Calcium carbonate 0.6 | 0.15 | θ type aluminum oxide 0.1 | 0.2 | 4.5 | 2.0 |
| Ex. 15 | Silicone resin 1.2 | 0.0008 | 50 | Calcium carbonate 0.6 | 0.15 | θ type aluminum oxide 0.1 | 0.2 | 4.5 | 2.0 |

Ex.: Example

TABLE 6

| | thickness of layer A (μm) | thickness of layer B (μm) | SRz/SRa | Ra (nm) | Abrasion resistance against calender (rating) | Abrasion resistance against blade | High-speed running | | | | | |
|---|---|---|---|---|---|---|---|---|---|---|---|---|
| | | | | | | | Scratch resistance | | | Abrasion resistance | | |
| | | | | | | | Method A | Method B | Method C | Method A | Method B | Method C |
| Ex. 9 | 14.0 | — | 25 | 12 | 1 | ⊚ | ⊚ | ⊚ | ⊚ | ⊚ | ⊚ | ⊚ |
| Ex. 10 | 14.0 | — | 24 | 13 | 1 | ⊚ | ⊚ | ⊚ | ⊚ | ⊚ | ⊚ | ⊚ |
| Ex. 11 | 14.0 | — | 24 | 13 | 1 | ⊚ | ⊚ | ⊚ | ⊚ | ⊚ | ⊚ | ⊚ |
| Ex. 12 | 14.0 | — | 25 | 12 | 1 | ⊚ | ⊚ | ⊚ | ⊚ | ⊚ | ⊚ | ⊚ |
| Ex. 13 | 1.5 | 11.0 | 27 | 11 | 1 | ⊚ | ⊚ | ⊚ | ⊚ | ⊚ | ⊚ | ⊚ |
| Ex. 14 | 1.0 | 12.0 | 30 | 10 | 1 | ⊚ | ⊚ | ⊚ | ⊚ | ⊚ | ⊚ | ⊚ |
| Ex. 15 | 1.0 | 12.0 | 28 | 11 | 1 | ⊚ | ⊚ | ⊚ | ⊚ | ⊚ | ⊚ | ○ |

| | Low-speed repeated running | | | | | | Windability | | Electromagnetic conversion characteristics |
|---|---|---|---|---|---|---|---|---|---|
| | Scratch resistance | | | Running friction coefficient | | | | | |
| | Method A | Method B | Method C | Method A | Method B | Method C | reference | Windability | C/N |
| Ex. 9 | ⊚ | ⊚ | ⊚ | 0.23 | 0.22 | 0.22 | 80 | ○ | +1.6 |
| Ex. 10 | ⊚ | ⊚ | ⊚ | 0.22 | 0.22 | 0.21 | 70 | ○ | +1.5 |
| Ex. 11 | ⊚ | ⊚ | ⊚ | 0.22 | 0.21 | 0.21 | 70 | ○ | +1.4 |
| Ex. 12 | ⊚ | ⊚ | ⊚ | 0.23 | 0.22 | 0.22 | 80 | ○ | +1.6 |
| Ex. 13 | ⊚ | ⊚ | ⊚ | 0.23 | 0.22 | 0.22 | 90 | ○ | +1.8 |
| Ex. 14 | ⊚ | ⊚ | ⊚ | 0.24 | 0.23 | 0.23 | 100 | ○ | +2.0 |
| Ex. 15 | ⊚ | ⊚ | ⊚ | 0.23 | 0.23 | 0.22 | 90 | ○ | +1.9 |

Ex.: Example

What is claimed is:

1. A biaxially oriented polyester film which consists of a polyester composition comprising:
   a) 0.0005 to 0.03% by weight of crosslinked polymer particles having an average particle diameter $d_A$ of 0.8 to 1.6 μm,
   b) 0.1 to 0.8% by weight of inert particles having an average particle diameter $d_B$ of 0.4 to 0.8 μm, and
   c) 0.05 to 1.0% by weight of inert inorganic particles having an average particle diameter $d_C$ of 0.01 to 0.3 μm and a Moh's hardness of not less than 7, and which satisfies the following equations (1) and (2):

$$1.5 \leq d_A/d_B \leq 3 \tag{1}$$

wherein $d_A$ and $d_B$ are defined as above, $$SRz/SRa \geq 20 \tag{2}$$

wherein SRz is a three dimensional 10-points average roughness of a film surface and SRa us a three dimensional center plane average roughness of a film surface,
   wherein the inert inorganic particles having an average particle diameter $d_C$ are agglomerates of particles having an average agglomeration rate of 2 to 20, and
   the biaxially oriented polyester film has a film thickness of 3 to 25 μm.

2. The biaxially oriented polyester film of claim 1, wherein the crosslinked polymer particles are at least one member selected from the group consisting of crosslinked silicone particles and crosslinked polystyrene particles.

3. The biaxially oriented polyester film of claim 1, wherein the crosslinked polymer particles have an apparent Young's modulus of 10 to 100 kgf/mm².

4. The biaxially oriented polyester film of claim 1, wherein the inert particles having an average particle diameter $d_B$ is calcium carbonate.

5. The biaxially oriented polyester film of claim 1, wherein the inert inorganic particles having an average particle diameter $d_C$ are at least one member selected from the group consisting of aluminum oxide and spinel oxides.

6. The biaxially oriented polyester film of claim 1, wherein the crosslinked polymer particles having an average particle diameter $d_A$ and the inert particles having an average particle diameter $d_B$ satisfy the following equation (1)-1:

$$1.7 \leq d_A/d_B \leq 2.7 \tag{1-1}$$

wherein $d_A$ and $d_B$ are defined as above.

7. The biaxially oriented polyester film of claim 1 which satisfies the following equation (2)-1:

$$SRz/SRa \geq 22 \tag{2-1}$$

wherein SRz and SRa are defined as above.

8. The biaxially oriented polyester film of claim 1 which has a three dimensional center plane average roughness SRa of a film surface in the range of 10 to 25 nm.

9. The biaxially oriented polyester film of claim 1 which has a centerline average roughness Ra of a film surface in the range of 10 to 25 nm.

10. The biaxially oriented polyester film of claim 1 which has a three dimensional 10-points average roughness SRz of a film surface in the range of 300 to 600 nm.

11. The biaxially oriented polyester film of claim 1 which has a windability reference at a wind-up rate of 200 m/min of not more than 150.

12. The biaxially oriented polyester film of claim 1 which has a film thickness of 5 to 25 μm.

13. The biaxially oriented polyester film of claim 1 which is used as a base film for a magnetic recording medium.

14. A magnetic recording medium comprising the biaxially oriented polyester film of claim 1 as a base film and a magnetic layer on a surface of the film.

* * * * *